US008564571B2

(12) United States Patent
Travis

(10) Patent No.: US 8,564,571 B2
(45) Date of Patent: Oct. 22, 2013

(54) BIREFRINGENT LENSLET CAMERA

(75) Inventor: Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 13/149,671

(22) Filed: May 31, 2011

(65) Prior Publication Data
US 2012/0306831 A1    Dec. 6, 2012

(51) Int. Cl.
*G06F 3/042*    (2006.01)
(52) U.S. Cl.
USPC .... 345/175; 345/207; 348/333.01; 348/14.16
(58) Field of Classification Search
USPC .................................................. 345/175, 207
See application file for complete search history.

(56) References Cited

U.S. PATENT DOCUMENTS

| | | | |
|---|---|---|---|
| 4,710,760 A | 12/1987 | Kasday | |
| 5,135,183 A | 8/1992 | Whitney | |
| 6,677,999 B2 | 1/2004 | Bean et al. | |
| 7,417,617 B2 | 8/2008 | Eichenlaub | |
| 7,714,923 B2 * | 5/2010 | Cok et al. .................. | 348/333.01 |
| 8,314,782 B2 * | 11/2012 | Ino et al. ......... | 345/175 |
| 2010/0103139 A1 * | 4/2010 | Soo et al. ........ | 345/175 |
| 2010/0118003 A1 * | 5/2010 | Yamashita et al. ............ | 345/205 |
| 2011/0037732 A1 * | 2/2011 | Takama et al. ................ | 345/175 |
| 2011/0122071 A1 * | 5/2011 | Powell ......................... | 345/173 |

OTHER PUBLICATIONS

Izadi, et al., "C-Slate: A Multi-Touch and Object Recognition System for Remote Collaboration using Horizontal Surfaces",Retrieved at <<http://research.microsoft.com/pubs/132551/cslate1.pdf>>, Second Annual IEEE International Workshop on Horizontal Interactive Human-Computer System, 2007, pp. 3-10.
Harrold, et al., "Autostereoscopic Display Technology for Mobile 3DTV Applications", Retrieved at <<http://www.ocuity.co.uk/Ocuity_SPIE_07.pdf>>, 2007, pp. 1-12.
Saeed, et al., "A Method of generating Full Color LCD using Birefringent Filters in a Stacked Design", Retrieved at <<http://www.lci.kent.edu/ipp/techjournals/Vol%2011/saeedMethod.pdf>>, 2001, pp. 6.

* cited by examiner

*Primary Examiner* — Lixi C Simpson
(74) *Attorney, Agent, or Firm* — Alleman Hall McCoy Russell & Tuttle LLP

(57) ABSTRACT

Embodiments of a display device with a vision system are disclosed. In one example, a display device comprises a plurality of pixels for displaying light in a first polarization state, a plurality of photodetectors, where each photodetector in the plurality of photodetectors includes a polarization filter configured to transmit light in a second polarization state to the photodetector and reject light in other polarization states, a plurality of lenslets, where each lenslet in the plurality of lenslets focuses light in the second polarization state onto at least one photodetector in the plurality of photodetectors, a material surrounding the plurality of lenslets, where, for each lenslet in the plurality of lenslets, indices of refraction of the lenslet and the material are substantially equal for light in the first polarization state, and where indices of refraction of the lenslet and the material are different for light in the second polarization state.

20 Claims, 2 Drawing Sheets

BIREFRINGENT LENSLET CAMERA

BACKGROUND

Display devices, such as liquid crystal displays (LCD's) and organic light emitting diodes (OLED) displays, may be outfitted with image sensors or vision systems so that the display device may display and capture off-screen images. For example, if such a display device is coupled to a computing system, the captured images may permit a user to interact with the system, e.g., via user motions or user touch.

In one example approach, a camera may be disposed adjacent to an edge of a display device to capture off-screen images. However, in such an approach, as a user approaches the screen e.g., as a user's finger approaches the screen, the point of view of the camera may be too oblique to capture images of the finger as it moves close to the surface of the screen.

SUMMARY

Various embodiments are disclosed that relate to a display device which includes a vision system. In one example approach, a display device is disclosed comprising a plurality of pixels for displaying light in a first polarization state, a plurality of photodetectors, where each photodetector in the plurality of photodetectors includes a polarization filter configured to transmit light in a second polarization state to the photodetector and reject light in other polarization states, and a plurality of lenslets. Each lenslet focuses light in the second polarization state onto at least one of the photodetectors. Surrounding each lenslet is a material, with the indices of refraction of the lenslet and the material being substantially equal for light in the first polarization state, and different for light in the second polarization state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
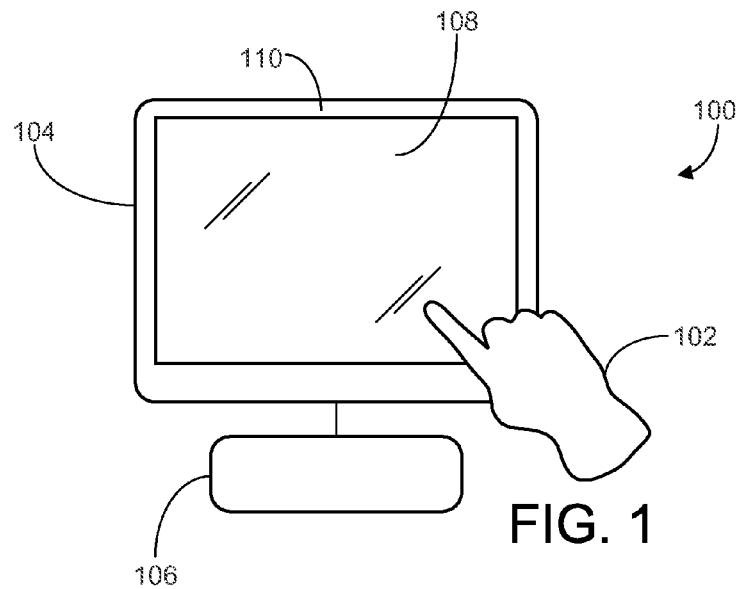
FIG. 1 shows an example interaction of a user with a display device.

FIG. 1 shows example interaction 100 of a user 102 with a display device 104. Display device may be a liquid crystal display (LCD), organic light emitting diodes (OLED) display, or any other suitable display device, for example. Display device 104 includes a screen 108, which may include one or more image capture devices, such as photodetectors or cameras as described in more detail below. The image capture device(s) on screen 108 may be configured to capture off-screen images, e.g., fingers of user 102 as the user approaches, hovers over, or touches the screen.

In some examples, display device 104 may be included in a computing system 106, e.g., as described in more detail below with respect to FIG. 4. In such a case, images captured by the image sensors on the screen of the display device may be processed by computing system 106, e.g., to permit a user, such as user 102, to interact with the system or to record and capture image and video data for processing.

As remarked above, in one example approach, a camera may be disposed adjacent to an edge, e.g., edge 110, of display device to capture off-screen images. For example, such a camera may be a web camera, depth camera, or other suitable image capture device. However, in such an approach, as a user approaches the screen, e.g., as a user's finger approaches the screen, the field of view of the camera may be too oblique to capture images of the finger as it moves close to the surface of the screen.

In another example approach, photodetectors may be placed or positioned adjacent to each pixel on the screen of the display device. However, photodetectors may only detect the presence or absence of light thus may detect light emitted from the display device which may drown out incoming light. In still another example approach, lenses may be disposed in front of photodetectors on the screen of the display device. However, in this approach, the lenses may obstruct or distort light being emitted by the display device.

In view of the above, birefringent (double refracting) lenses may be employed together with photodetectors in a display device so that outbound light emitted by the display device remains substantially undistorted and inbound light is imaged by the display device even at close range.

Figure 2:
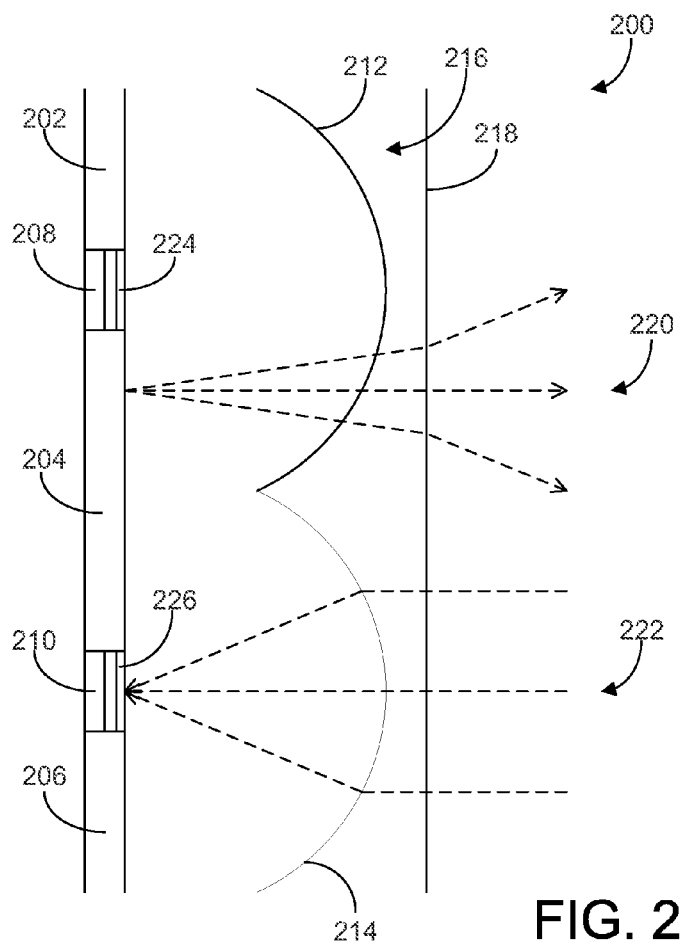
FIG. 2 shows a cross-section of an embodiment of a display device in accordance with the disclosure.

For example, FIG. 2 shows a cross-section 200 of an embodiment of a display device which incorporates birefringent lenses and photodetectors in a display device.

The display device shown in FIG. 2 includes a plurality of display pixels for displaying or emitting light. The pixels may be of any suitable dimension, e.g., a diameter of a pixel may be approximately 1 millimeter in length. For example, pixels 202, 204, and 206 are shown in FIG. 2. In some examples, the plurality of pixels may emit substantially polarized light. For example, pixels 202, 204, and 206 may display light in a first polarization state.

The display device also includes a plurality of photodetectors for receiving incoming light. For example, photodetectors 208 and 210 are shown in FIG. 2.

The display device further includes a plurality of lenslets. For example, lenslet 212 and lenslet 214 are shown in FIG. 2. In some examples, each lenslet may be composed of a birefringent material. For example, the lenslets may be composed of a mixture of photopolymer and liquid crystal which has been aligned then cured with ultraviolet. As another example, the lenslets may be composed of reactive mesogen materials, for example. Each lenslet includes at least one photodetector in the focal plane of the lenslet.

A material 216 surrounds the plurality of lenslets and is adjacent to a surface 218 of the display device. Material 216 may be composed of any suitable material. In some examples, material 216 may be composed of a birefringent material, such as the example materials given above; whereas, in other examples material 216 may not be composed of a birefringent material. Further, in some examples, an index of refraction of material 216 may be lower than an index of refraction of the lenslets.

The lenslets surrounded by the material form a polarization splitting prism film which behaves as if transparent to outgoing light from the display and focuses incoming orthogonally polarized light onto the photodetectors. Thus, either the lenslets or the material, or both the lenslets and the material may be composed of a birefringent material.

Figure 3:
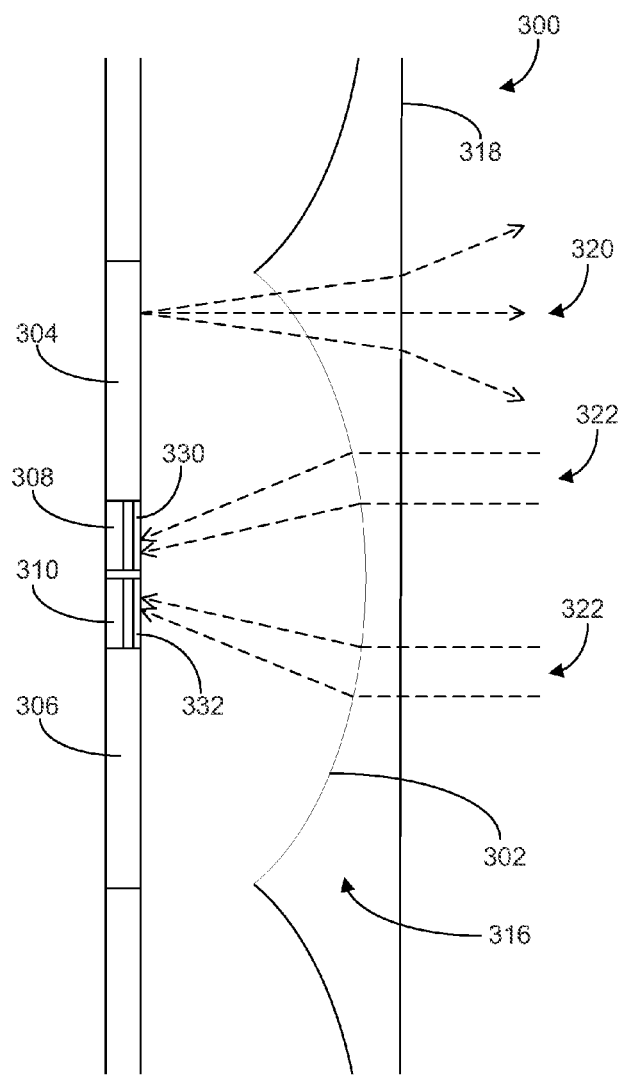
FIG. 3 shows a cross-section of another embodiment of a display device in accordance with the disclosure.

In some examples, such as shown in FIG. 2, a single lenslet may span or cover one photodetector and one pixel. However, in other examples, such as shown in FIG. 3 described below, a single lenslet may span a plurality of pixels and/or a plurality of photodetectors.

As remarked above, each lenslet is composed of a birefringent, or double refracting material. That is, each lenslet may be configured to refract light with a first polarization by a first amount and refract light with a second polarization by a second amount. Namely, a birefringent lenslet may have different indices of refraction for light of different polarizations.

Further, as remarked above, light emitted from the pixels may have a first polarization. Thus, by a suitable choice of material for material 216 surrounding the lenslets, it can be arranged so that the refractive indices of material 216 and the lenslets are substantially equal for light of the first polarization state of outgoing light. In this way, the light emitted from the pixels, e.g., as shown at 220 in FIG. 2, may pass through the display device substantially unchanged.

However, for light of a second polarization, different from the first polarization, the indices of refraction of the lenslet and the material may be different. In this way, the second polarization component of incoming light, e.g., as shown at 222 in FIG. 2, may be refracted and focused by a lenslet onto one or more photodetectors beneath the lenslet.

The first and second polarizations described above may be any suitable types of polarizations, e.g., they may be linearly polarized, circularly polarized, elliptically polarized, etc. However, the first and second polarizations may be substantially orthogonal. Further, in order to increase a focusing power of the lenslets, the difference between the indices of refraction of the lenslet and the material for the second polarization may be increased as much as possible.

Each photodetector may further include a polarization filter (or polarizer) configured to transmit light in the second polarization state to the photodetector and reject light in other polarization states. For example, as shown in FIG. 2 photodetector 208 includes polarization filter 224 and photodetector 210 includes polarization filter 226. In this way, the second polarization component of incoming light may be transmitted to the photodetector while light emitted from the pixels may be rejected.

However, depending on the size of the pixels and a thickness of the display device, e.g., a thickness of 1 centimeter may be desired, the focal length of the lenslets may be so small so as to lead to aperture diffraction which may distort light emitted from the pixels and limit resolution in the far field. Thus in some examples, larger lenslets may be employed which span a plurality of pixels and multiple photodetectors may be employed for each lenslet to increase image capture resolution, such as shown in FIG. 3 described below.

Turning now to FIG. 3, a cross-section 300 of another embodiment of a display device in accordance with the disclosure is shown. As above, the display device includes a plurality of lenslets surrounded by a material 316 adjacent to a surface 318 of the display device.

In the example shown in FIG. 3, a single birefringent lenslet 302 spans or covers two pixels 304 and 306. Further, two photodetectors 308 and 310 are used to capture the second polarization component of incoming light focused by lenslet 302. As described above, each photodetector includes a polarization filter to transmit the second polarization component of incoming light, e.g. as shown at 322 in FIG. 3, to the photodetector while rejecting light of other polarizations. For example, photodetector 308 includes polarization filter 330 and photodetector 310 includes polarization filter 332. Further, since the indices of refraction of lenslet 302 and material 316 are substantially equal for the first polarization state of outgoing light, shown at 320 in FIG. 3, the outgoing light is substantially unchanged as it leaves the display device.

Figure 4:
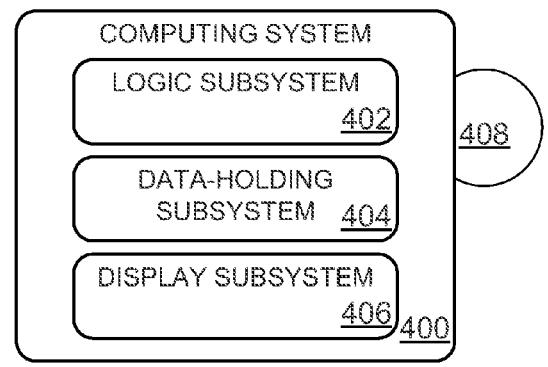
FIG. 4 shows an example computing system in accordance with the disclosure.

FIG. 4 schematically shows a nonlimiting computing system 400 which may include a display device, such as display device 104 shown in FIG. 1. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

Computing system 400 includes a logic subsystem 402 and a data-holding subsystem 404. Computing system 400 also includes a display subsystem 406, and may additionally include other components not shown in FIG. 4. Computing system 400 may also optionally include user input devices such as keyboards, mice, game controllers, cameras, microphones, and/or touch screens, for example.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding subsystem 404 may be transformed (e.g., to hold different data).

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 408, which may be used to store and/or transfer data and/or instructions executable to implement various processes. Removable computer-readable storage media 408 may take the form of CDs, DVDs, HD-DVDs, Blu-Ray Discs, EEPROMs, and/or floppy disks, among others.

When included, display subsystem 406 may be used to present a visual representation of data held by data-holding subsystem 404 and capture image data as described herein. Display subsystem 406 may include one or more display devices utilizing virtually any type of technology. Such display devices may be combined with logic subsystem 402 and/or data-holding subsystem 404 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device comprising:
   a plurality of pixels for displaying light in a first polarization state;
   a plurality of photodetectors, where each photodetector in the plurality of photodetectors includes a polarization filter configured to transmit light in a second polarization state to the photodetector and reject light in other polarization states;
   a plurality of lenslets, where each lenslet in the plurality of lenslets focuses light in the second polarization state onto at least one photodetector in the plurality of photodetectors;
   a material surrounding the plurality of lenslets, where, for each lenslet in the plurality of lenslets, indices of refraction of the lenslet and the material are substantially equal for light in the first polarization state, and where indices of refraction of the lenslet and the material are different for light in the second polarization state.

2. The display device of claim 1, wherein each lenslet in the plurality of lenslets is birefringent and the material is not birefringent.

3. The display device of claim 1, wherein each lenslet in the plurality of lenslets is birefringent and the material is birefringent.

4. The display device of claim 1, wherein each lenslet in the plurality of lenslets is not birefringent and the material is birefringent.

5. The display device of claim 1, wherein at least one lenslet in the plurality of lenslets covers at least two pixels.

6. The display device of claim 1, wherein the display device is a liquid crystal display device.

7. The display device of claim 1, wherein the display device is an organic light emitting diodes display device.

8. The display device of claim 1, wherein the first polarization state is orthogonal to the second polarization state.

9. The display device of claim 1, wherein each photodetector in the plurality of photodetectors is positioned adjacent to at least one pixel in the plurality of pixels.

10. A display device comprising:
    a plurality of pixels for displaying outgoing light in a first polarization state;
    a plurality of photodetectors for receiving incoming light, where each photodetector in the plurality of photodetectors is positioned adjacent to at least one pixel in the plurality of pixels, and where each photodetector in the plurality of photodetectors includes a polarization filter configured to transmit light in a second polarization state to the photodetector and reject light in other polarization states;
    a plurality of birefringent lenslets, where each lenslet in the plurality of lenslets focuses incoming light in the second polarization state onto at least one photodetector in the plurality of photodetectors;
    a material surrounding the plurality of lenslets, where, for each lenslet in the plurality of lenslets, indices of refraction of the lenslet and the material are substantially equal for light in the first polarization state, and where indices of refraction of the lenslet and the material are different for light in the second polarization state.

11. The display device of claim 10, wherein the material is not birefringent.

12. The display device of claim 10, wherein the material is birefringent.

13. The display device of claim 10, wherein at least one lenslet in the plurality of lenslets covers at least two pixels.

14. The display device of claim 10, wherein the display device is a liquid crystal display device.

15. The display device of claim 10, wherein the display device is an organic light emitting diodes display device.

16. The display device of claim 10, wherein the first polarization state is orthogonal to the second polarization state.

17. A display device comprising:
    a plurality of pixels for displaying outgoing light in a first polarization state;
    a plurality of photodetectors for receiving incoming light, where each photodetector in the plurality of photodetectors is positioned adjacent to at least one pixel in the plurality of pixels, and where each photodetector in the plurality of photodetectors includes a polarization filter configured to transmit light in a second polarization state to the photodetector and reject light in other polarization states, where the second polarization state is orthogonal to the first polarization state;
    a plurality of birefringent lenslets, where each lenslet in the plurality of lenslets includes at least one photodetector in a focal plane of the lenslet and focuses incoming light in the second polarization state onto the at least one photodetector;
    a material surrounding the plurality of lenslets, the material having a lower index of refraction than each lenslet in the plurality of lenslets, and where, for each lenslet in the plurality of lenslets, indices of refraction of the lenslet and the material are substantially equal for light in the first polarization state, and where indices of refraction of the lenslet and the material are different for light in the second polarization state.

18. The display device of claim 17, wherein the material is not birefringent.

19. The display device of claim 17, wherein the material is birefringent.

20. The display device of claim 17, wherein the display device is a liquid crystal display device or an organic light emitting diodes display device.

* * * * *